(12) United States Patent
Gabrielsson et al.

(10) Patent No.: US 7,200,990 B2
(45) Date of Patent: Apr. 10, 2007

(54) METHOD FOR CONTROLLING INJECTION OF REDUCING AGENT IN EXHAUST GAS FROM A COMBUSTION ENGINE

(75) Inventors: Pär Gabrielsson, Helsingborg (SE); Ioannis Gekas, Malmö (SE); Max Thorhauge, Herlev (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 11/288,152

(22) Filed: Nov. 29, 2005

(65) Prior Publication Data

US 2006/0130461 A1 Jun. 22, 2006

(30) Foreign Application Priority Data

Dec. 18, 2004 (DK) .............................. 2004 01954

(51) Int. Cl.
*F01N 3/00* (2006.01)

(52) U.S. Cl. ............... 60/286; 60/274; 60/286; 60/295; 60/301; 60/303

(58) Field of Classification Search ............... 60/274, 60/276, 285, 286, 295, 297, 301, 303
See application file for complete search history.

(56) References Cited

U.S. PATENT DOCUMENTS 5,628,186 A * 5/1997 Schmelz ............... 60/274
5,950,422 A 9/1999 Dolling
6,119,448 A * 9/2000 Emmerling et al. ......... 60/274
6,415,602 B1 * 7/2002 Patchett et al. ............ 60/286
6,427,439 B1 8/2002 Xu et al.
6,532,736 B2 * 3/2003 Hammerle et al. ......... 60/286
7,065,958 B2 * 6/2006 Funk et al. ................. 60/286

* cited by examiner

*Primary Examiner*—Binh Q. Tran
(74) *Attorney, Agent, or Firm*—Dickstein Shapiro LLP

(57) ABSTRACT

The invention relates to a method for controlling injection of a reductant into a $NO_x$ containing exhaust gas stream from a combustion engine, where combustion of a known fuel takes place and where the $NO_x$ is reduced by selective catalytic reduction, SCR, in the presence of a SCR catalyst, comprising establishing signals related to exhaust gas flow, $HO_x$ concentration in the exhaust gas stream upstream of the catalyst, exhaust gas temperature upstream of the SCR catalyst, exhaust gas temperature downstream of the SCR catalyst and to input data for catalyst characteristics. From the signals an adjusted amount of the reductant is calculated by using a calculated amount of reductant and a value $d(E*T)/dt$, where E is the exhaust gas flow, T is the exhaust gas temperature upstream of the catalyst and t is time.

9 Claims, 2 Drawing Sheets

METHOD FOR CONTROLLING INJECTION OF REDUCING AGENT IN EXHAUST GAS FROM A COMBUSTION ENGINE

BACKGROUND OF THE INVENTION

1. Field of the Invention

The invention relates to a method for controlling a stream containing a component, which takes part in a catalytic reaction and which adsorbes on the catalyst.

The invention is in particular directed to control of injection of a reductant to an exhaust gas, where formed nitroaen oxides are selectively, catalytically reduced and where the reducing component is adsorbed on or desorbed from the surface of the catalyst. Both reducing component and nitrogen oxides must be avoided in the catalyst effluent.

The invention is especially useful in purifying an exhaust gas from combustion engines in vehicles, where nitrogen oxides are reduced by ammonia possibly injected as an aqueous solution of ammonia or urea.

2. Description of Related Art

Purification of an exhaust gas is already performed in many ways. One way is disclosed in U.S. Pat. No. 6,427,439, where purification of exhaust gas is carried out by catalytically reducing the nitrogen oxides, $NO_x$. The addition of the reducing agent is controlled by an electronic engine controller, EEC, which determines the amount of reductant to be added as proportional to the $NO_x$ concentration, when this concentration is above a predetermined value. When the $NO_x$ concentration is lower and the amount of adsorbed ammonia is less than the ammonia capacity of the catalyst, the amount of added reductant is a predetermined amount. The EEC uses signals from measurements of $NO_x$ concentration, $NH_3$ concentration, temperature, engine speed and engine load for calculation of the amount of adsorbed $NH_3$ on the catalyst surface and of reductant addition at the time of the calculation. However, this means many different measurements and calculations are involved in a vehicle where load of the engine increases and decreases frequently and quickly.

In U.S. Pat. No. 5,628,186 a further method for addition of a reducing agent is described. The addition is controlled by detecting operation parameters of the engine and catalyst in the exhaust gas and then determining from $NO_x$ measurement the required amount of $NH_3$ and then adjusting this from the catalyst performance. The temperature is calculated from the performance of the engine. This requires several computing steps.

The injection strategy for reductant addition of the process of U.S. Pat. No. 6,119,448 uses similar measurements, furthermore, a reference engine is included in the calculations.

Also patent number U.S. Pat. No. 5,950,422 discloses an exhaust gas purification method. The similar calculations of amount of reductant to be added is performed by dividing the catalyst volume into several sub-regions, where after calculations for each sub-region are performed.

Though a great number of methods to control addition of reductant into exhaust gas are known in the art, there is still need to improve $NO_x$ conversion by controlled addition of a reductant in order to prevent detrimental leakage of the reductant into the environment.

SUMMARY OF THE INVENTION

Accordingly, it is an object of the invention to provide a method and a system for controlling injection of a reductant into a combustion engine exhaust gas. The method is based on simple and reliable measurements to obtain a signal for solution flow regulation of reducing agent, which always quickly is corrected to correspond to changes in operation of the combustion engine.

The invention relates to a method for controlling injection of a reductant into a $NO_x$ containing exhaust gas stream from a combustion engine, where the $NO_x$ is reduced by selective catalytic reduction, SCR, in the presence of a SCR catalyst.

The method comprises steps of establishing signals related to exhaust gas flow, to $NO_x$ concentration in the exhaust gas stream upstream of the SCR catalyst and to exhaust gas temperature upstream and downstream of the SCR catalyst.

The method further comprises the steps of calculating a molar $NO_x$ flow in the exhaust gas stream upstream of the SCR catalyst, a $NO_x$ conversion in the catalyst, a required amount of reductant and of adjusting the required amount of reductant responsive to the signals.

The method still further comprises the steps of establishing signals related to the molar $NO_x$ flow, the $NO_x$ conversion, the required amount of reductant and to an adjusted amount of reductant.

The required amount of reductant is by the method of the invention adjusted by calculating a value $d(E*T)/dt$, where t is time, E is the exhaust gas flow, and T is the exhaust gas temperature upstream of the SCR catalyst and by establishing a signal related to the value $d(E*T)/dt$. This signal and the signal responsive to the required amount of reductant are used for calculation of the adjusted amount of reductant.

The signal related to the adjusted amount of reductant is used for metering the adjusted amount of reductant, which is injected into the exhaust gas.

The invention is further related to an exhaust gas system using the control method, where the system contains an SCR catalyst, an injection nozzle upstream of the catalyst and sensor devices, wherein the sensor devises consist of a sensor for measuring $NO_x$ concentration upstream of the catalyst; sensors for measuring two of combustion air mass flow, fuel mass flow and $O_2$ concentration in exhaust gas or a sensor for measuring exhaust gas mass flow upstream of the catalyst, and further a sensor for measuring temperature of the exhaust gas upstream of the catalyst and a sensor for measuring temperature of the exhaust gas downstream of the catalyst.

The advantage is that by using only five instrument signals and a parameter describing the rate of the change of the product of exhaust gas flow and catalyst temperature, very quick and reliable corrections of the signal for reductant injection is obtained. This ensures maximum $NO_x$ conversion and simultaneously avoiding $NH_3$ slip outlet the catalyst.

DETAILED DESCRIPTION OF THE INVENTION

Figure 1:
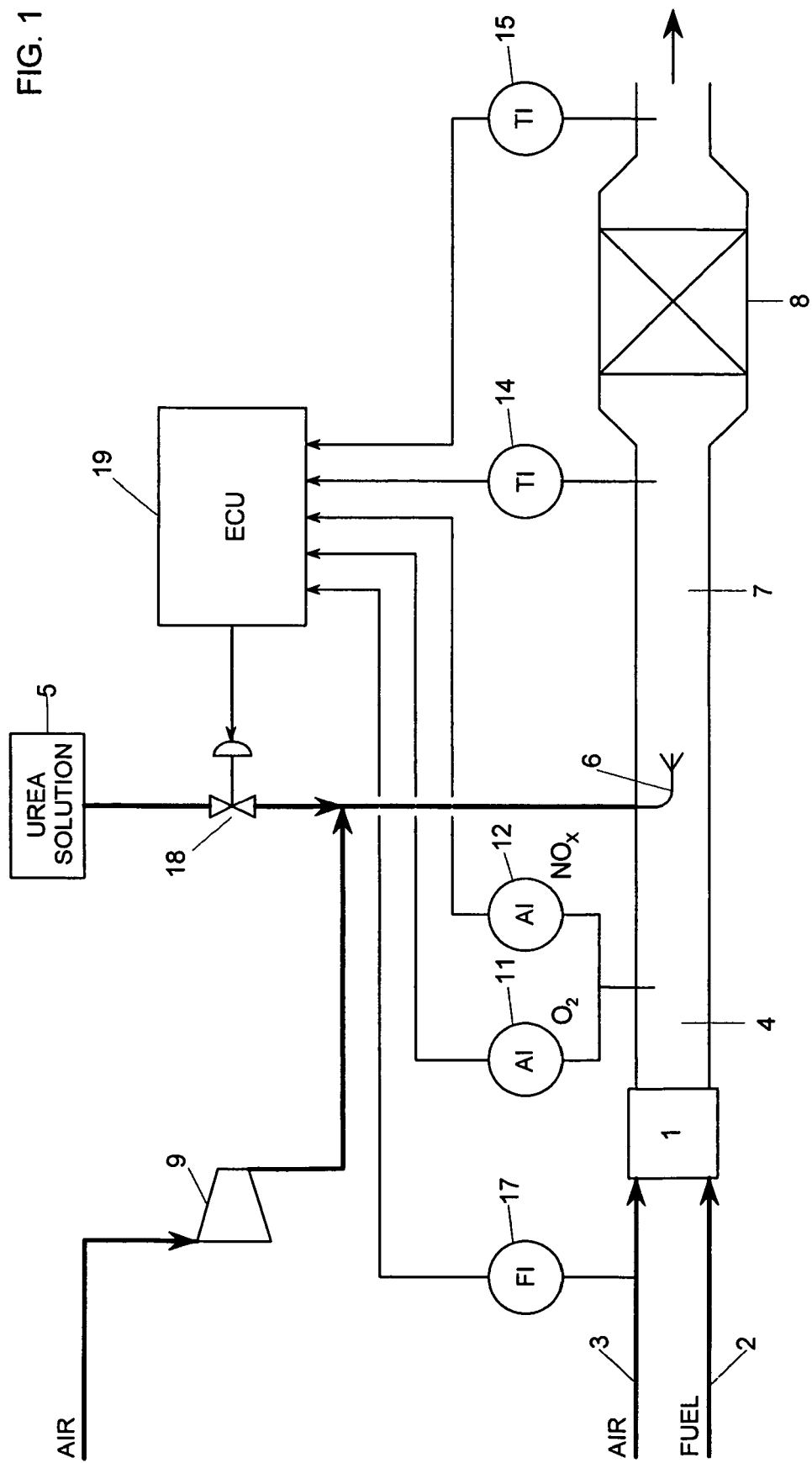
FIG. 1 is a schematic drawing of a combustion engine exhaust system with injection of a solution of a reactant into an exhaust gas stream upstream of a catalyst.

A complete combustion of a fuel $CH_x$ in combustion engines would be:

$$CH_x + (1+x/4)O_2 \rightarrow CO_2 + x/2\, H_2O \quad (1)$$

where $O_2$ is oxygen in combustion air.

In diesel engine driven vehicles combustion takes place with a certain amount of excess air. This results in formation of nitrogen oxides, $NO_x$ in the exhaust gas, which is a serious pollution for the environment.

$NO_x$ can be reduced by ammonia, $NH_3$, which however is difficult to store in vehicles, and an aqueous solution of ammonia or urea, $H_2NCONH_2$, is therefore preferred as a reducing agent.

The ammonia is formed when urea decomposes as it is sprayed into the hot exhaust gas according to the following reaction:

$$H_2NCONH_2 + H_2O \rightarrow 2\, NH_3 + CO_2 \quad (2)$$

The mixture of exhaust gas and reductant, ammonia, then passes over a catalyst where the nitrogen oxides, nitrogen monoxide, NO and nitrogen dioxide, $NO_2$, react with the ammonia to form nitrogen and water according to at least the following reactions:

$$4\, NO + 4\, NH_3 + O_2 \leftrightarrows 4\, N_2 + 6\, H_2O \quad (3)$$

and $$6\, NO_2 + 8\, NH_3 \leftrightarrows 7\, N_2 + 12\, H_2O \quad (4)$$

The reduction processes are equilibrium reactions and the equilibrium is dependent of temperature, catalyst volume, catalyst activity and concentration of the present components. Thereby, it is not possible to convert all the $NO_x$, only a theoretical maximal amount can be converted.

As it appears from reactions (3) and (4) it is important to inject the correct amount of ammonia or urea solution into the hot exhaust gas. Sufficient ammonia must be present to obtain as high conversion as possible.

On the other hand, surplus of ammonia, resulting in leakage of ammonia from the catalyst and into to the atmosphere, must be avoided.

During reaction, a certain amount of ammonia is adsorbed on the surface of the catalyst. When reaction conditions, especially exhaust gas flow and temperature, change due to change in load/operation conditions of the engine, desorption or increased adsorption will occur resulting in lack or surplus of ammonia. This will result in incomplete conversion of $NO_x$ or in $NH_3$ slip out into the atmosphere. It is therefore very important to inject the correct amount of urea/ammonia to the exhaust gas and to adjust this amount very quickly and precisely during variations of operation of the engine.

The invention provides a method and a system for an accurate injection of urea solution into an exhaust gas. The method comprises five measurements and four steps for determining of main parameters and creating a correct, updated signal to a urea solution flow control valve, dosing pump or other control device.

The first step is calculation of $NO_x$ flow in the exhaust gas, the second step is a calculation of $NO_x$ conversion, the third step is a determination of theoretical required amount of reductant and the fourth step is a determination of the actual requirement of the amount of reductant by use of an event based filter. The involved calculations are carried out with a frequency of between 5 and 30 Hz, i.e. one calculation loop is carried out in between 33 and 200 ms.

An example of a specific use of the invention is shown on FIG. 1. Combustion takes place in diesel motor 1 of fuel 2 and with air 3 forming an exhaust gas stream 4, which contains a certain amount of $NO_x$ and $O_2$ due to added excess air. Reducing agent, preferably an aqueous solution of urea 5 is stored in a tank and injected to the exhaust gas stream through nozzle 6. Urea solution in the hot exhaust gas stream is immediately decomposed to $NH_3$ and $CO_2$ according to reaction (2) resulting in exhaust gas stream 7, which is passed through a catalyst 8, where a selective catalytic reduction of $HO_x$ by $NH_3$ to $N_2$ takes place.

The air from air compressor 9 to urea is used for pushing the urea solution through nozzle 6 and for obtaining a good atomisation of the solution.

The $O_2$ content in stream 4 is measured by analyser 11 and the $HO_x$ content by analyser 12, while temperatures inlet and outlet of the catalyst are measured by temperature instruments 14 and 15, respectively.

The flow of air 3 to motor 1 is measured by flow instrument 17 and the urea solution flow is regulated by valve 18. The signals from the measuring instruments are received by an electronic control unit, ECU, 19, which creates an up-dated accurate signal for the control valve 18.

Figure 2:
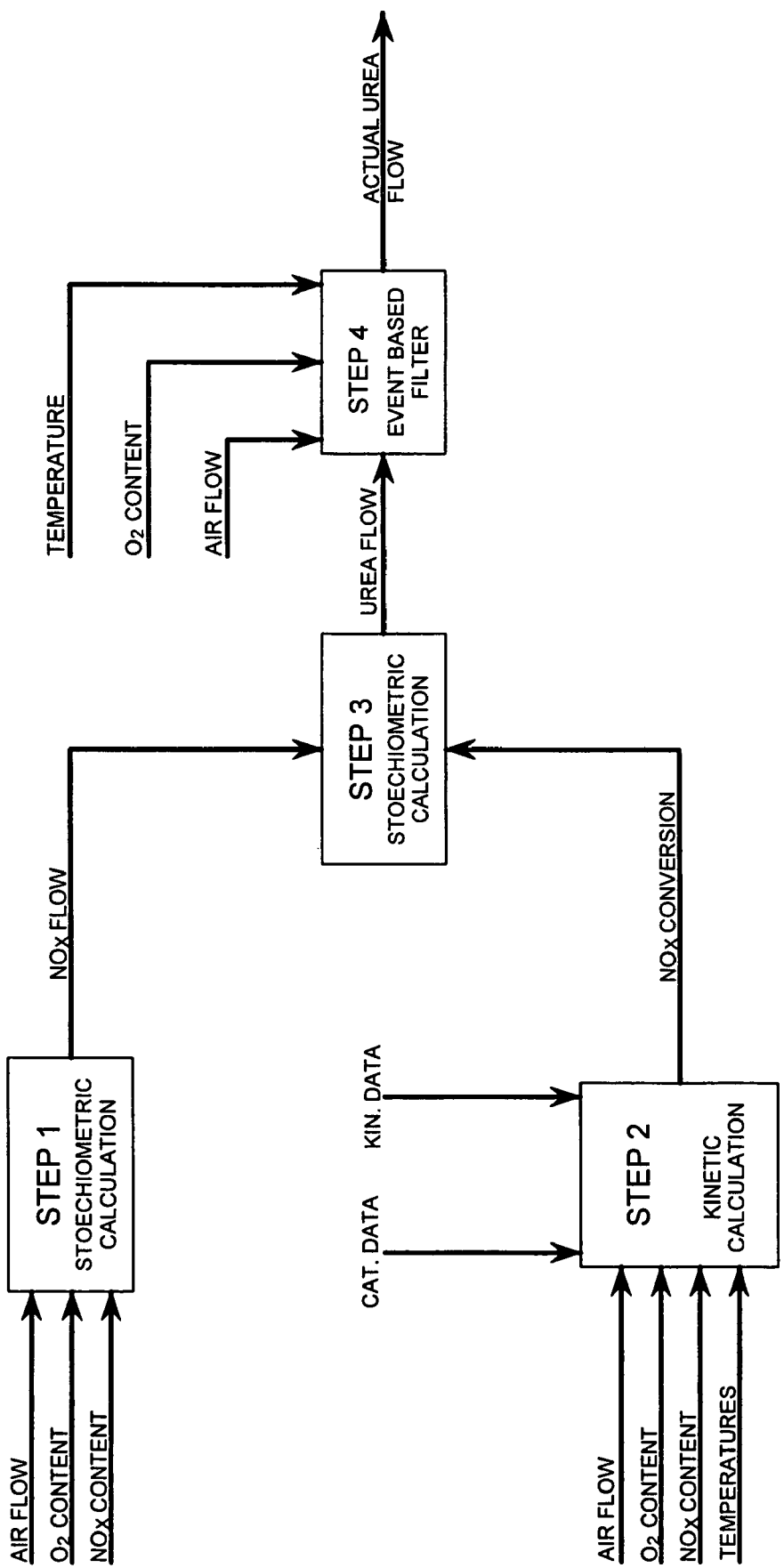
FIG. 2 is a block diagram showing the measurements and principles for calculation of the amount of reactant to be injected into an exhaust gas stream.

A specific embodiment of the invention is shown on FIG. 2. Step 1 is a stoichiometric calculation of the amount of $NO_x$ created by the combustion and calculated as moles/hours. The calculation is based on measurement of air to combustion measured as kg/h, measurement of $O_2$ content in exhaust gas measured as volumetric % and $NO_x$ content measured as ppm by volume.

The $NO_x$ flow calculation can be carried out using different methods. One method is as above based on using the air mass flow into the engine, the oxygen content of the exhaust gas and the $HO_x$, i.e. the NO and $NO_2$ concentrations in the exhaust gas. These can be given either by a sensor or by engine maps. The stoichiometric calculation is based on the assumption of a complete combustion of a fuel with the general formula $CH_x$, with air to form $CO_2$ and $H_2O$ according to reaction 1. With the fuel composition known, the oxygen content of the exhaust gas and one of either air mass flow or fuel flow to the engine known, the exhaust gas flow can be calculated. The exhaust gas flow may also be based on measurement of fuel and combustion air flow or on measurement of pressure drop across the catalyst. Further, the mass flow of the exhaust gas may be directly measured by a sensor, which then is installed in a gas with high temperature. Alternatively, the $NO_x$ concentration can be given directly to step 1 of engine control system.

Step 2 calculates the maximum possible or wanted $NO_x$ conversion based on the same three measurements as step 1 plus measurement of temperature of the exhaust gas inlet and outlet of the catalyst. Set points for parameters as catalyst data and reaction kinetic are given, optionally, a desired maximum conversion as well.

The kinetic calculation of the injection strategy is based on a tubular reactor model, which besides the chemical reaction calculation also includes calculations for outer mass transfer (film transfer) and pore diffusion within the catalyst. The kinetic reactor model calculates the maximum possible $NO_x$ conversion over the catalyst that can be achieved for a given point of engine operation. The inputs for the calculation are the exhaust gas flow, $NO_x$ flow, the $O_2$ concentration, the temperatures and a predetermined $NH_3$ slip. The exhaust gas flow and the $NO_x$ flow are obtained in the same way as in step 1, as the exhaust gas flow is determined during step 1. The $NH_3$ slip is set together with catalyst data, such as catalyst volume, length, void, hydraulic diameter, catalyst activity and the kinetic parameters for the above mentioned reactions. In the kinetic part a maximum allowed conversion could be set as part of the injection strategy.

The maximum allowed conversion may be used to tune the system for engines where different $NO_x$ reductions are required to reach a legislative target. Alternatively, a reduced $NO_x$ reduction efficiency can be accomplished with the system by fictively reducing the catalyst volume in the data set for the calculations.

Results from steps 1 and 2 are used in step 3 to obtain the theoretically required amount of urea solution to be injected at a certain moment.

This theoretical amount is further adjusted in the event based filter, step 4, based on measurement of exhaust gas temperature inlet of catalyst, air flow measurement and $O_2$ measurement and on determination of exhaust gas flow as in step 2 in order to avoid leakage of ammonia or $NO_x$ during transient conditions.

The amount of ammonia adsorbed on the catalyst surface changes especially with changes in exhaust gas flow and temperature. The filter takes into consideration the historical data of the catalyst in order to foresee the $NH_3$ adsorption/desorption capacity of the catalyst. If the conditions of the catalyst are such that a large desorption of ammonia can occur, then part of the calculated (step 3) urea injection is retained and stored in the memory of the injection algorithm. On the other hand, if the conditions are favourable for the adsorption of $NH_3$ on the catalyst, then the actual urea injection can be increased until the amount of urea as stored in the memory is used up. This is to assure that the mass balance over time is correct.

The filter determines at any time changes in the product of exhaust gas flow and temperature, $d(E*T)/dt$, where
E is exhaust gas flow,
T is temperature, and
t is time.

If $d(E*T)/dt$ is positive, flow and/or temperature are increasing making desorption of ammonia from the catalyst favourable, then a part of the calculated urea is retained and stored for later use. The retained urea is re-injected when the change in the product is negative, i.e. flow and/or temperature are decreasing, thus making adsorption of ammonia on the catalyst favourable.

The mentioned measurements are performed by sensors, which are commercially available.

By the method of the invention, the amount of injected urea solution is immediately adjusted, $NH_3$ leakage from the catalyst is avoided and simultaneously maximum $NO_x$ conversion is obtained at any and varying load of the motor.

The injection strategy can be tuned to obtain an improved transient operation by adjusting the parameters of the event based filter.

In principal, the same injection algorithm can be used for any type of engine, the compliance with the emission regulations is controlled by the determination of the catalytic volume, which depends on the mass flow of exhaust gas from the specific engine.

The invention is particular useful in cars, vans, lorries, trains, ships or generators, which are driven by diesel combustion engines, and where the exhaust gas system is equipped with a selective catalytic reduction system. The invention will secure a very low degree of emission of poisonous $NH_3$ and $NO_x$ to the atmosphere, even at big and/or frequent changes in load of engine.

The invention claimed is:

1. A method for controlling injection of a reductant into an $NO_x$ containing exhaust gas stream from a combustion engine, where the $NO_x$ is reduced by selective catalytic reduction, SCR, in the presence of a SCR catalyst, comprising the steps of
  establishing a signal related to exhaust gas flow;
  establishing a signal related to $NO_x$ concentration in the exhaust gas stream upstream of the SCR catalyst;
  establishing a signal related to exhaust gas temperature upstream of the SCR catalyst;
  establishing a signal related to exhaust gas temperature downstream of the SCR catalyst;
  calculating a molar $NO_x$ flow in the exhaust gas stream upstream of the SCR catalyst and establishing a signal related to the molar $NO_x$ flow;
  calculating an $NO_x$ conversion in the catalyst and establishing a signal related to the $NO_x$ conversion;
  calculation of a required amount of reductant and establishing a signal related to the required amount of reductant;
  adjusting the required amount of reductant;
  establishing a signal related to an adjusted amount of reductant;
  using the signal related to the adjusted amount of reductant for metering the adjusted amount of reductant; and
  injecting the adjusted amount of reductant into the exhaust gas;
wherein,
  the required amount of reductant is adjusted by calculation of a value $d(E*T)/dt$, where
  t is time,
  E is the exhaust gas flow, and
  T is the exhaust gas temperature upstream of the SCR catalyst and establishing a signal related to the value $d(E*T)/dt$; and
  calculation of the adjusted amount of reductant by means of the signals responsive to the required amount of reductant and of the value $d(E*T)/dt$.

2. Method of claim 1, wherein the establishing of the signal relating to the exhaust gas flow, comprises
  establishing signals related to two of mass flow of combustion air, mass flow of fuel and related to $O_2$ concentration in the exhaust gas stream; and
  calculation of the exhaust gas flow responsive to the signals.

3. Method of claim 1, wherein the calculation of $NO_x$ conversion in the catalyst comprises
  calculation of the $NO_x$ conversion responsive to the signals related to the exhaust gas flow, the $NO_x$ concentration in the exhaust gas stream and the temperatures upstream and downstream of the catalyst, and signals related to input data for catalyst dimensions, catalyst bed dimensions and kinetic data for the catalyst and $NO_x$ conversion reaction.

4. A method for controlling injection of a reductant into a $NO_x$ containing exhaust gas stream from a combustion engine, where the $NO_x$ is reduced by selective catalytic reduction, SCR, in the presence of a SCR catalyst, comprising the steps of
  (a) establishing a signal related to two of a mass flow of combustion air, mass flow of fuel and $O_2$ concentration in the exhaust gas stream,
  establishing a signal related to $NO_x$ concentration in the exhaust gas stream upstream of the catalyst,
  establishing a signal related to exhaust gas temperature upstream of the SCR catalyst, and establishing a signal related to exhaust gas temperature downstream of the SCR catalyst;

(b) calculation of a molar $NO_x$ flow in the exhaust gas stream responsive to the signals of two of the mass flow of combustion air, the mass flow of fuel and the $O_2$ concentration in the exhaust gas stream and of the $NO_x$ concentration in the exhaust gas stream;

(c) calculation a of $NO_x$ conversion in the catalyst responsive to $NO_x$ concentration in the exhaust gas stream, the exhaust gas temperature upstream and downstream of the SCR catalyst, and of two of the signal of the mass flow of air to combustion, the mass flow of fuel and the $O_2$ concentration in the exhaust gas stream;

(d) calculation of a required amount of reductant responsive to signals of the molar $NO_x$ flow in the exhaust gas stream and of the $NO_x$ conversion in the catalyst;

(e) calculation of an adjusted amount of reductant responsive to signals of the required amount of reductant, the exhaust gas temperature, T, upstream of the SCR catalyst, and of two of the mass flow of air to combustion, the mass flow of fuel and the $O_2$ concentration in the exhaust gas stream, the calculation including calculation of a value $d(E*T)/dt$, where t is time, E is the exhaust gas flow, and T is the exhaust gas temperature upstream of the SCR catalyst; and (f) injection of the adjusted amount of reductant into the exhaust gas stream.

5. The method of claim 4, wherein the reductant is ammonia, an aqueous solution of ammonia or an aqueous solution of urea.

6. The method claim 4, wherein the engine is a diesel engine.

7. An exhaust gas system for use in the method of claim 1 for controlling injection of a reductant into a $NO_x$ containing exhaust gas stream from a combustion engine, where a selective catalytic reduction, SCR, system is installed, containing an SCR catalyst, an injection nozzle upstream of the catalyst, an electronic control unit, and a sensor for measuring $NO_x$ concentration upstream of the catalyst;

sensors for measuring two of mass flow of air to combustion, mass flow of fuel and $O_2$ concentration or a sensor for measuring exhaust gas mass flow upstream of the catalyst;

a sensor for measuring temperature of the exhaust gas upstream of the catalyst; and a sensor for measuring temperature of the exhaust gas downstream of the catalyst;

wherein, the electronic control unit calculates an amount of reductant to be injected by a procedure comprising calculation of a value $d(E*T)/dt$, where t is time, E is the exhaust gas flow, and T is the exhaust gas temperature upstream of the SCR catalyst.

8. The method of claim 1, wherein the reductant is ammonia, an aqueous solution of ammonia or an aqueous solution of urea.

9. The method claim 1, wherein the engine is a desel engine.

* * * * *